(12) United States Patent
Pelman et al.

(10) Patent No.: US 9,038,329 B2
(45) Date of Patent: May 26, 2015

(54) STRUCTURE FOLLOWING ROOF MOUNTED PHOTOVOLTAIC SYSTEM

(71) Applicants: Todd Pelman, San Francisco, CA (US); Miguel Praca, San Anselmo, CA (US); Rodney Holland, Novato, CA (US); Louis Basel, 'S-Gravenhage (NL); Jaquelyn Miyatake, 'S-Gravenhage (NL)

(72) Inventors: Todd Pelman, San Francisco, CA (US); Miguel Praca, San Anselmo, CA (US); Rodney Holland, Novato, CA (US); Louis Basel, 'S-Gravenhage (NL); Jaquelyn Miyatake, 'S-Gravenhage (NL)

(73) Assignee: SunLink Corporation, San Rafael, CA (US)

( * ) Notice: Subject to any disclaimer, the term of this patent is extended or adjusted under 35 U.S.C. 154(b) by 105 days.

(21) Appl. No.: 13/649,781

(22) Filed: Oct. 11, 2012

(65) Prior Publication Data

US 2014/0102996 A1    Apr. 17, 2014

Related U.S. Application Data

(60) Provisional application No. 61/627,381, filed on Oct. 11, 2011.

(51) Int. Cl.
*E04D 13/18* (2014.01)
*F24J 2/52* (2006.01)

(52) U.S. Cl.
CPC .............. *F24J 2/5233* (2013.01); *F24J 2/5249* (2013.01); *F24J 2/5254* (2013.01); *F24J 2/5258* (2013.01); *F24J 2/526* (2013.01); *F24J 2002/5215* (2013.01); *F24J 2002/5226* (2013.01); *F24J 2002/5279* (2013.01); *F24J 2002/5292* (2013.01); *Y02B 10/20* (2013.01); *Y02E 10/47* (2013.01)

(58) Field of Classification Search
USPC .................................. 52/173.3; 136/244, 251
See application file for complete search history.

(56) References Cited

U.S. PATENT DOCUMENTS

| | | | |
|---|---|---|---|
| 2,131,464 | A | 9/1938 | Estes |
| 2,651,852 | A | 9/1953 | Urbain |
| 3,947,138 | A | 3/1976 | Dinwoodie |
| 3,988,166 | A | 10/1976 | Beam |
| 4,038,967 | A | 8/1977 | Stout et al. |
| 4,111,188 | A | 9/1978 | Murphy, Jr. |

(Continued)

FOREIGN PATENT DOCUMENTS

| | | |
|---|---|---|
| DE | 2602814 A1 | 8/1977 |
| DE | G7913751.2 U1 | 5/1979 |

(Continued)

OTHER PUBLICATIONS

Buresch, M. "Photovoltiac Energy Systems Design and Installation", McGraw-Hill Book Company, 1983, pp. 201-211.

(Continued)

*Primary Examiner* — Basil Katcheves
*Assistant Examiner* — Joshua Ihezie
(74) *Attorney, Agent, or Firm* — Reed Smith LLP

(57) ABSTRACT

An adjustable photovoltaic panel mounting system that allows for variations in roofs and roof elements, while still maintaining a rigid and secure assembly. The specific location for supporting feet and structural elements of the mounting system may be varied to allow for variations in roof features and different panel configurations. The mounting mechanisms are adjustable in both a North/South and a East/West direction to provide for maximum layout flexibility.

23 Claims, 16 Drawing Sheets

(56) References Cited

U.S. PATENT DOCUMENTS

| | | | |
|---|---|---|---|
| 4,204,523 A | 5/1980 | Rothe | |
| 4,226,256 A | 10/1980 | Hawley | |
| 4,252,109 A | 2/1981 | Newton | |
| 4,336,413 A | 6/1982 | Tourneux | |
| 4,371,139 A * | 2/1983 | Clark | 248/237 |
| 4,389,533 A | 6/1983 | Ames | |
| 4,461,279 A | 7/1984 | Gaden | |
| 4,476,853 A | 10/1984 | Arbogast | |
| 4,611,090 A | 9/1986 | Catella et al. | |
| 4,620,771 A | 11/1986 | Dominguez | |
| 4,636,577 A | 1/1987 | Peterpaul | |
| 4,649,675 A | 3/1987 | Moldovan et al. | |
| 4,674,244 A | 6/1987 | Francovitch | |
| 4,677,248 A | 6/1987 | Lacey | |
| 4,718,404 A | 1/1988 | Sadler | |
| 4,724,010 A | 2/1988 | Okaniwa et al. | |
| 4,830,678 A | 5/1989 | Todorof et al. | |
| 4,832,001 A | 5/1989 | Baer | |
| 4,886,554 A | 12/1989 | Woodring et al. | |
| 4,922,264 A | 5/1990 | Fitzgerald et al. | |
| 4,936,063 A | 6/1990 | Humphrey | |
| 5,112,408 A | 5/1992 | Melchior et al. | |
| 5,125,608 A * | 6/1992 | McMaster et al. | 248/163.1 |
| 5,142,293 A | 8/1992 | Ross | |
| 5,164,020 A | 11/1992 | Wagner et al. | |
| 5,205,072 A | 4/1993 | Eutebach | |
| 5,228,924 A | 7/1993 | Barker et al. | |
| 5,338,369 A | 8/1994 | Rawlings | |
| 5,409,549 A | 4/1995 | Mori | |
| 5,505,788 A | 4/1996 | Dinwoodie | |
| 5,525,401 A | 6/1996 | Ishikawa et al. | |
| 5,588,181 A | 12/1996 | Sutton | |
| 5,732,180 A | 3/1998 | Kaplan | |
| 5,746,839 A | 5/1998 | Dinwoodie | |
| 6,004,002 A | 12/1999 | Giannone | |
| 6,046,399 A * | 4/2000 | Kapner | 136/244 |
| 6,063,996 A | 5/2000 | Takada et al. | |
| 6,441,297 B1 | 8/2002 | Keller et al. | |
| 6,560,821 B2 | 5/2003 | Miller et al. | |
| 6,570,084 B2 | 5/2003 | Dinwoodie | |
| 6,662,801 B2 | 12/2003 | Hayden et al. | |
| 6,784,360 B2 * | 8/2004 | Nakajima et al. | 136/251 |
| 6,809,251 B2 * | 10/2004 | Dinwoodie | 136/251 |
| 6,953,038 B1 | 10/2005 | Nohrig | |
| 6,968,654 B2 | 11/2005 | Moulder et al. | |
| RE38,988 E | 2/2006 | Dinwoodie | |
| 7,240,400 B2 | 7/2007 | Bonham | |
| 7,305,797 B2 | 12/2007 | Chiang | |
| 7,814,899 B1 * | 10/2010 | Port | 126/623 |
| 8,250,829 B2 * | 8/2012 | McPheeters et al. | 52/710 |
| 8,397,448 B2 * | 3/2013 | Brown et al. | 52/173.3 |
| 8,413,944 B2 * | 4/2013 | Harberts et al. | 248/500 |
| 8,539,719 B2 * | 9/2013 | McPheeters et al. | 52/27 |
| 8,615,939 B2 * | 12/2013 | Seery et al. | 52/173.3 |
| 2003/0000569 A1 | 1/2003 | Zwanenburg | |
| 2003/0070368 A1 | 4/2003 | Shingleton | |
| 2003/0098056 A1 | 5/2003 | Fronek et al. | |
| 2003/0101662 A1 | 6/2003 | Ullman | |
| 2004/0031902 A1 | 2/2004 | Davis, Jr. | |
| 2004/0216399 A1 | 11/2004 | Yamada et al. | |
| 2004/0250491 A1 * | 12/2004 | Diaz et al. | 52/518 |
| 2005/0005534 A1 | 1/2005 | Nomura et al. | |
| 2005/0115176 A1 | 6/2005 | Russell | |
| 2006/0053706 A1 * | 3/2006 | Russell | 52/173.3 |
| 2006/0118163 A1 | 6/2006 | Plaisted | |
| 2006/0288645 A1 | 12/2006 | Konstantino et al. | |
| 2007/0039610 A1 | 2/2007 | Head et al. | |
| 2007/0079865 A1 | 4/2007 | Warfield et al. | |
| 2008/0053517 A1 | 3/2008 | Plaisted et al. | |
| 2008/0083087 A1 | 4/2008 | Lin | |
| 2008/0169018 A1 * | 7/2008 | Miyamoto et al. | 136/251 |
| 2008/0251115 A1 | 10/2008 | Thompson et al. | |
| 2008/0302407 A1 * | 12/2008 | Kobayashi | 136/251 |
| 2009/0282755 A1 * | 11/2009 | Abbott et al. | 52/173.3 |
| 2010/0147362 A1 * | 6/2010 | King et al. | 136/251 |
| 2010/0243023 A1 * | 9/2010 | Patton et al. | 136/244 |
| 2010/0263297 A1 * | 10/2010 | Liebendorfer | 52/11 |
| 2010/0269888 A1 * | 10/2010 | Johnston, Jr. | 136/251 |
| 2011/0088740 A1 * | 4/2011 | Mittan et al. | 136/244 |
| 2011/0179727 A1 | 7/2011 | Liu | |
| 2011/0214368 A1 * | 9/2011 | Haddock et al. | 52/173.3 |
| 2011/0239546 A1 * | 10/2011 | Tsuzuki et al. | 52/11 |
| 2012/0117895 A1 * | 5/2012 | Li | 52/11 |
| 2012/0180406 A1 * | 7/2012 | Kobayashi | 52/173.3 |
| 2012/0266944 A1 * | 10/2012 | Wildes | 136/251 |
| 2012/0279557 A1 * | 11/2012 | Alwitt et al. | 136/251 |
| 2012/0285515 A1 * | 11/2012 | Sagayama | 136/251 |
| 2012/0312355 A1 * | 12/2012 | Patton et al. | 136/251 |
| 2013/0014809 A1 * | 1/2013 | Sagayama et al. | 136/251 |
| 2013/0091786 A1 * | 4/2013 | DuPont et al. | 52/173.3 |
| 2013/0112248 A1 * | 5/2013 | McPheeters | 136/251 |

FOREIGN PATENT DOCUMENTS

| | | |
|---|---|---|
| DE | 2758067 A1 | 7/1979 |
| DE | 2819901 A1 | 11/1979 |
| DE | 3926967 A1 | 2/1991 |
| DE | 3934485 A1 | 4/1991 |
| DE | G9114555.4 U1 | 2/1992 |
| DE | G9114556.2 U1 | 2/1992 |
| DE | 4232367 A1 | 5/1993 |
| DE | 29503315.0 U1 | 6/1995 |
| DE | 29719513 U1 | 3/1998 |
| DE | 29804621 U1 | 9/1998 |
| DE | 19811399 A1 | 9/1999 |
| DE | 19823356 A1 | 11/1999 |
| DE | 20008509 U1 | 9/2000 |
| DE | 20011063 U1 | 9/2000 |
| DE | 29724278 U1 | 10/2000 |
| DE | 20120983 U1 | 5/2002 |
| DE | 20200072 U1 | 7/2002 |
| DE | 20200672 U1 | 7/2002 |
| DE | 20218424 U1 | 4/2003 |
| DE | 20307139 U1 | 8/2003 |
| DE | 69815168 T2 | 4/2004 |
| DE | 202005003750 U1 | 6/2005 |
| DE | 29610516 U1 | 9/2006 |
| DE | 60032292 T2 | 7/2007 |
| DE | 102006026297 B3 | 8/2007 |
| DE | WO2008022179 A1 | 2/2008 |
| EP | 0282826 B1 | 12/1991 |
| EP | 0489791 B1 | 2/1993 |
| EP | 0436572 B1 | 11/1995 |
| EP | 0531869 B1 | 1/1997 |
| EP | 0857926 A1 | 8/1998 |
| EP | 1071136 A2 | 1/2001 |
| EP | 1243717 A2 | 9/2002 |
| EP | 1243718 A2 | 9/2002 |
| EP | 1306907 A1 | 5/2003 |
| EP | 1376029 A2 | 1/2004 |
| EP | 0828034 A2 | 11/2005 |
| EP | 1788322 A1 | 5/2007 |
| EP | 1310747 B1 | 6/2007 |
| ES | 1061941 U | 1/2006 |
| ES | 1063823 U | 10/2006 |
| ES | 1065162 U | 6/2007 |
| GB | WO03038910 A2 | 10/2002 |
| GB | WO2007135412 A1 | 11/2007 |
| JP | WO03083954 A2 | 10/2003 |
| NL | WO0273703 A1 | 9/2001 |
| NL | WO0263219 A1 | 8/2002 |
| WO | WO9003663 | 5/1990 |
| WO | WO 94/00650 A1 | 6/1994 |
| WO | WO0216707 A1 | 2/2002 |
| WO | WO2004066324 A2 | 5/2004 |
| WO | WO2004063485 A2 | 7/2004 |
| WO | WO2005/020290 | 3/2005 |

(56) References Cited

FOREIGN PATENT DOCUMENTS

| WO | WO2005059963 A1 | 6/2005 |
|----|-----------------|--------|
| WO | WO2006116398 A2 | 11/2006 |

OTHER PUBLICATIONS

Commission of the European Communities, "First E.C. Conference on Solar Collectors in Architecture, Integration of photovoltiac and thermal collectors in new and old building structures", Proceedings of the International Conference held at Venice, Italy, Mar. 1983, pp. 20-28, 108-120.

Davidson, J. The New Solar Electric Home the Photovoltaics How-To-Handbook, 1987, aatec publications, pp. 138-152.

Gillett, B., et al. "Photovoltaic Demonstration Projects", Commission of the European Communities, 1991, pp. 127-135, 190-197, 347-354.

Humm, O. et al. "Photovoltaik und Architektur Photovoltaics in Architecture", 1993, pp. 108-111.

Imamura, M.S. et al. "Photovoltaic System Technology", 1992 European Handbook, H.S. Stephens & Associates, Bedford, England: 1992. pp. 340-366.

"Phovoltiacs for Pumping Water", Solar Age, Feb. 1984, pp. 64.

Russell, M., et al. "PV Array Designs for Flat-Roof Buildings" IEEE, 1993 pp. 1129-1133.

Sick, F., et al. "Photovoltaics in Buildings, A Design Handbook for Architects and Engineers", London, UK, James & James 1996, pp. 143-144.

Schaefer, J. "What We Know About Rooftop Electricity" Solar Age, Apr. 1984, pp. 19-26.

Soderberg, P. "Living Beyond the Top of the World" Solar Today, Sep./Oct. 1992, pp. 11-13.

"Solar Energy in Architecture and Urban Planning" Third European conference on Architecture, May 1993, pp. 231-235 , 282-286.

Starr, M. "Photovoltaic Power for Europe", Solar Energy R&D in the European Community, Commission of the European Communities, Dordrecht, Holland, D. Reidel Publishing Co., 1983, pp. 31-37, 42-47.

Stefanakos, E. "Driving With the Sun: PV Electric Vehicle Recharging Station", Solar Today, 1993, pp. 15-16.

Strong, S., et al. "The Solar Electric House, A Design Manual for Home-Scale Photovoltaic Power Systems", Emmaus, PA: Rodale Press 1987, pp. 225-234.

"Today's Outstanding Photovoltaic Projects", Solar Age, Jun. 1985, pp. 40-45.

Weissman, J. "Photovoltaics for Utilities: Commercialization Through Collaboration" Solar Today, Mar./Apr. 1993, pp. 31-33.

Wolfe, M. "A Sunpowered Dream House" Solar Age, Dec. 1983, pp. 17-20.

Emile, et al. "Brevet D'Invention", Ministére de la Production Endustrielle et du Travail, Feb. 27, 1941.

\* cited by examiner

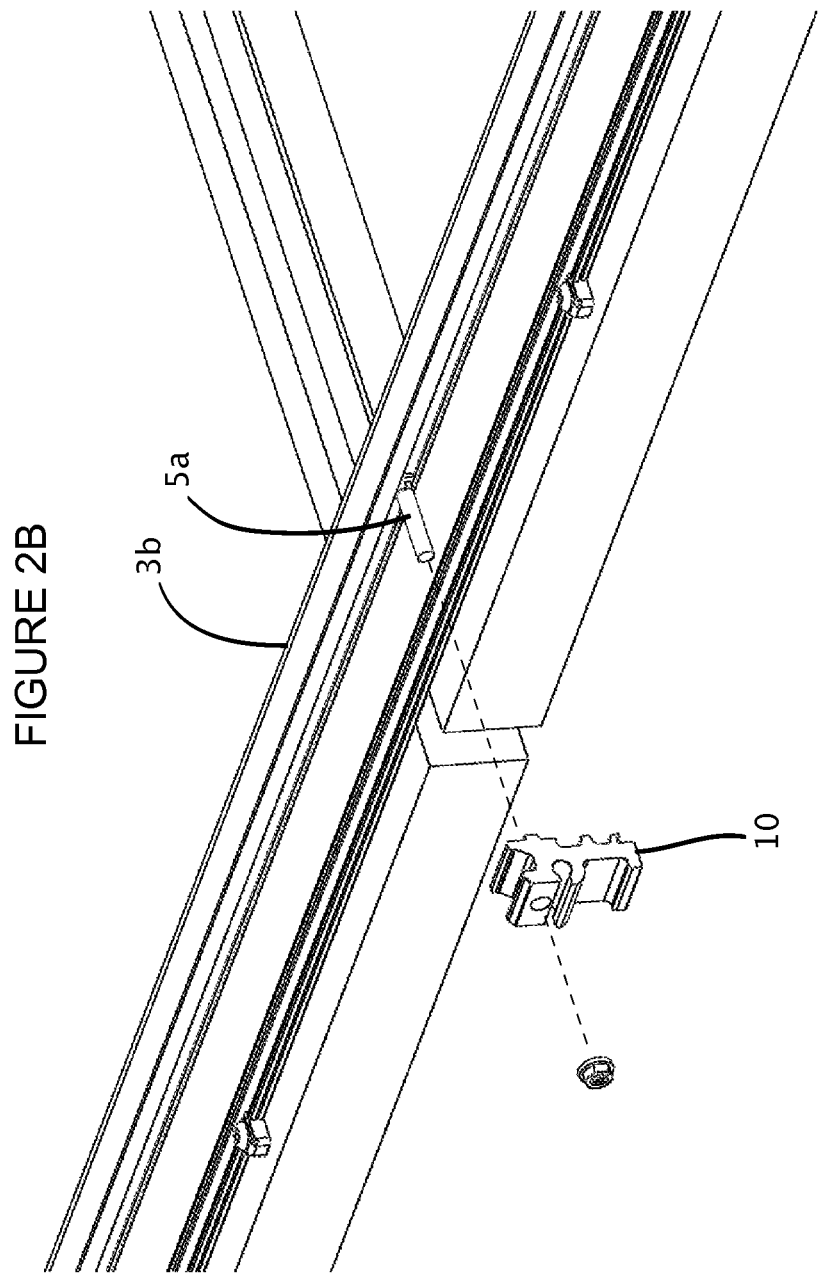

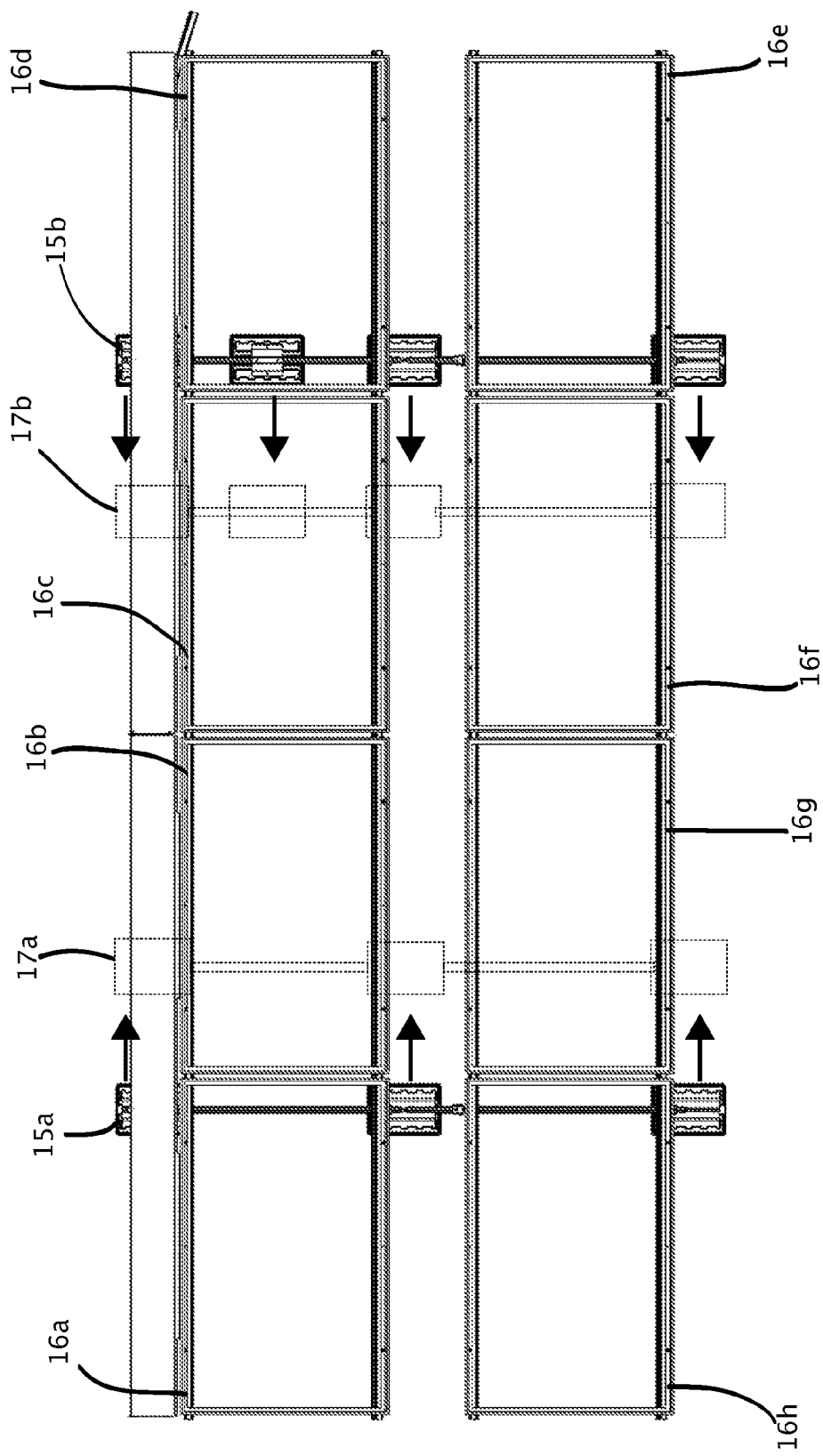

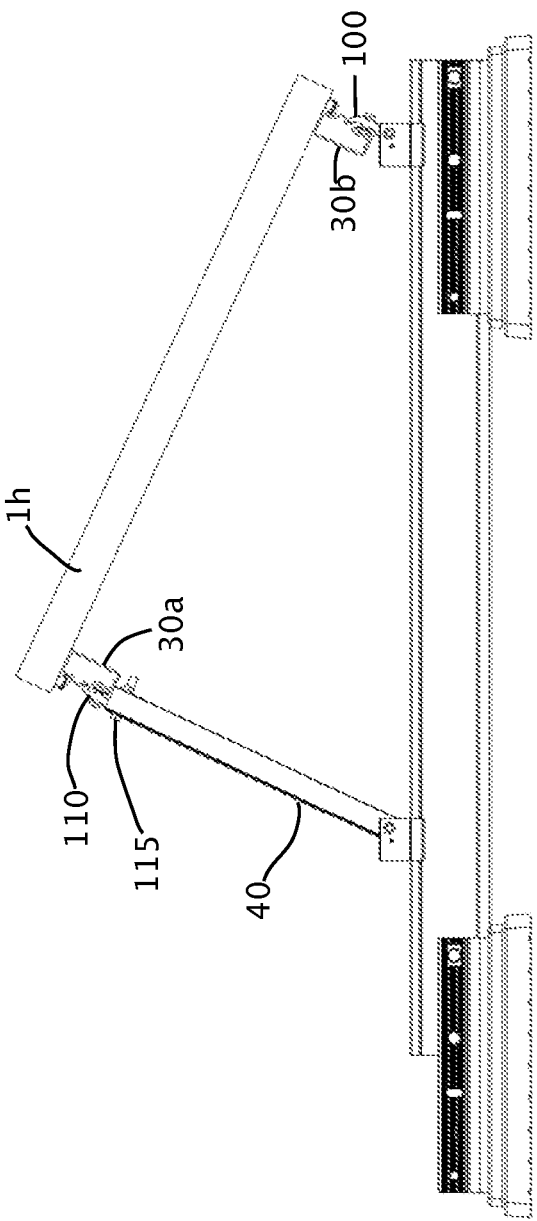

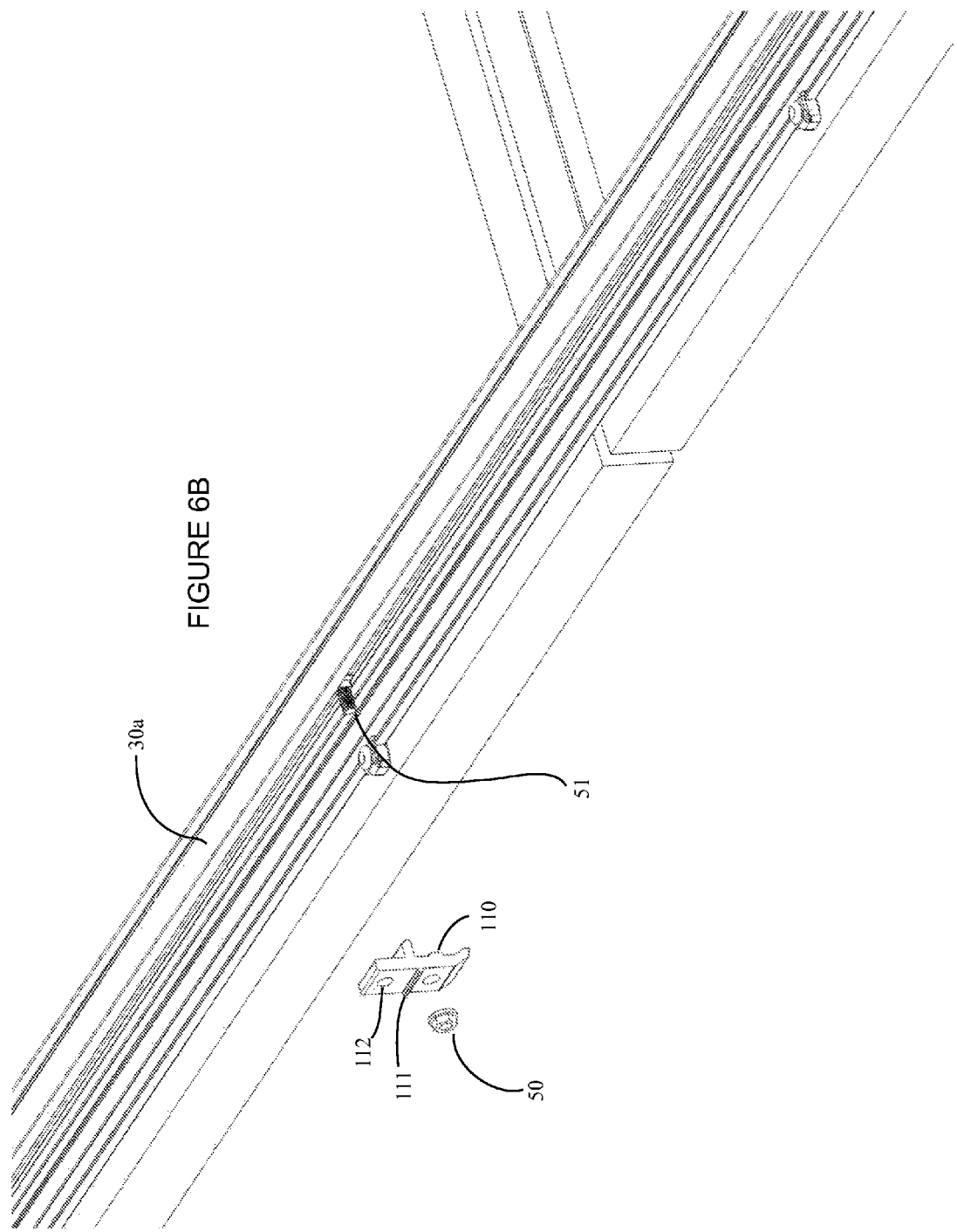

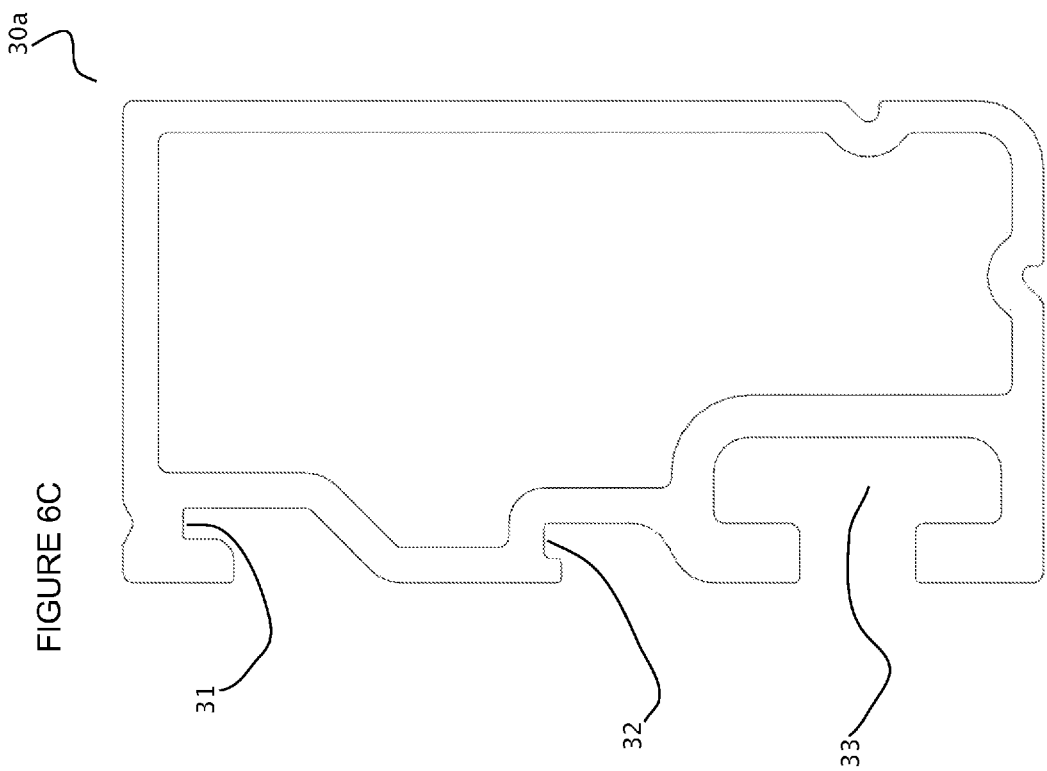

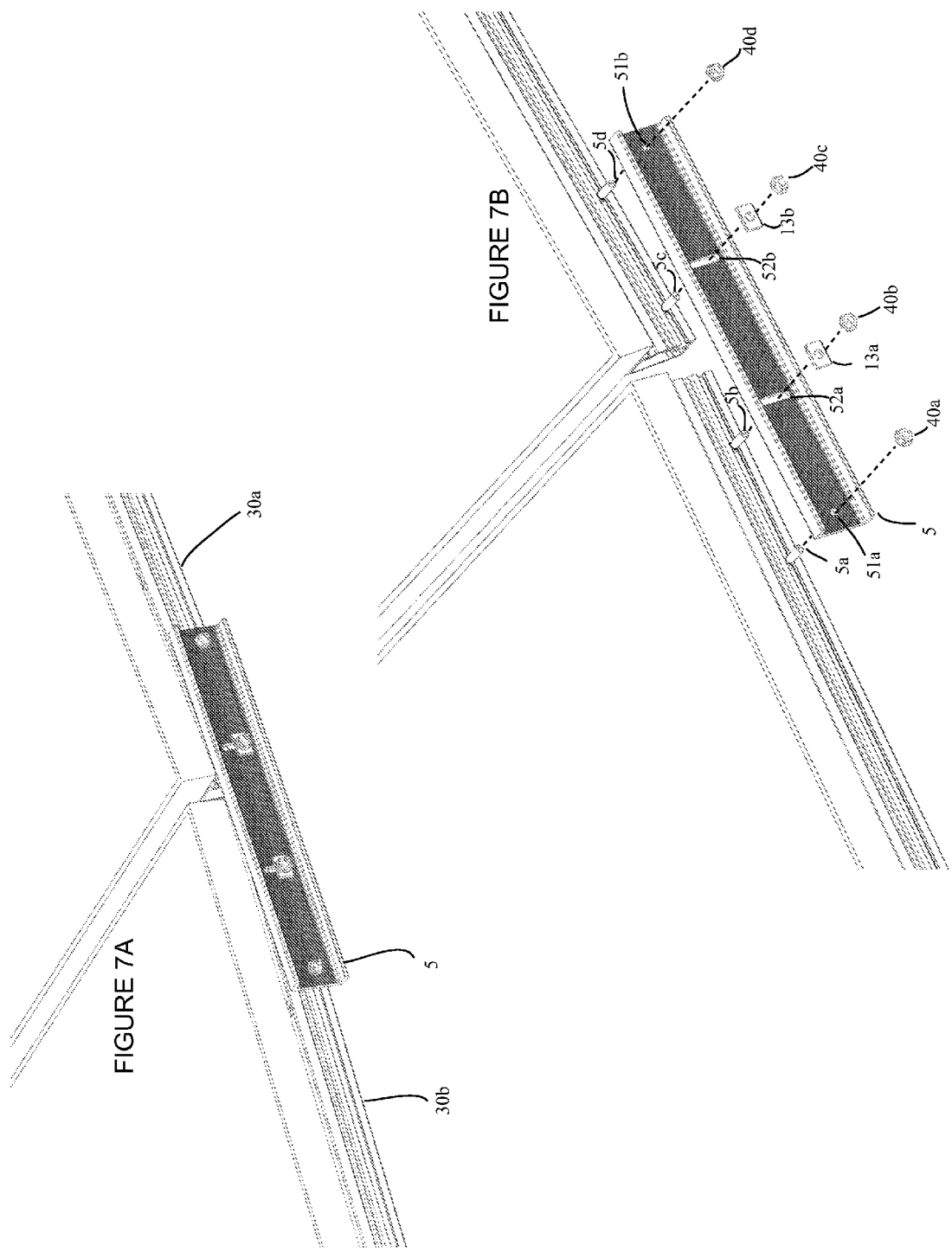

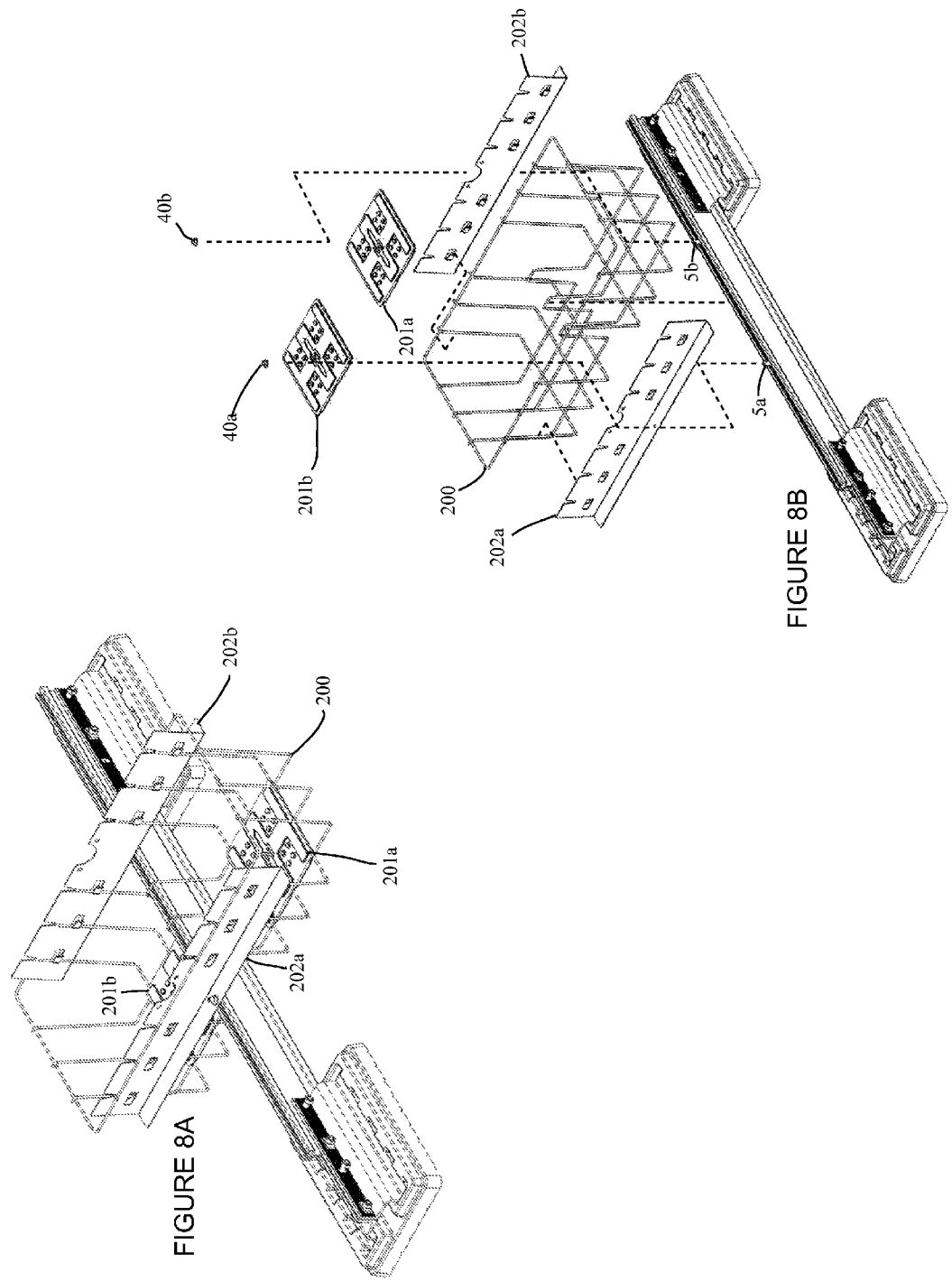

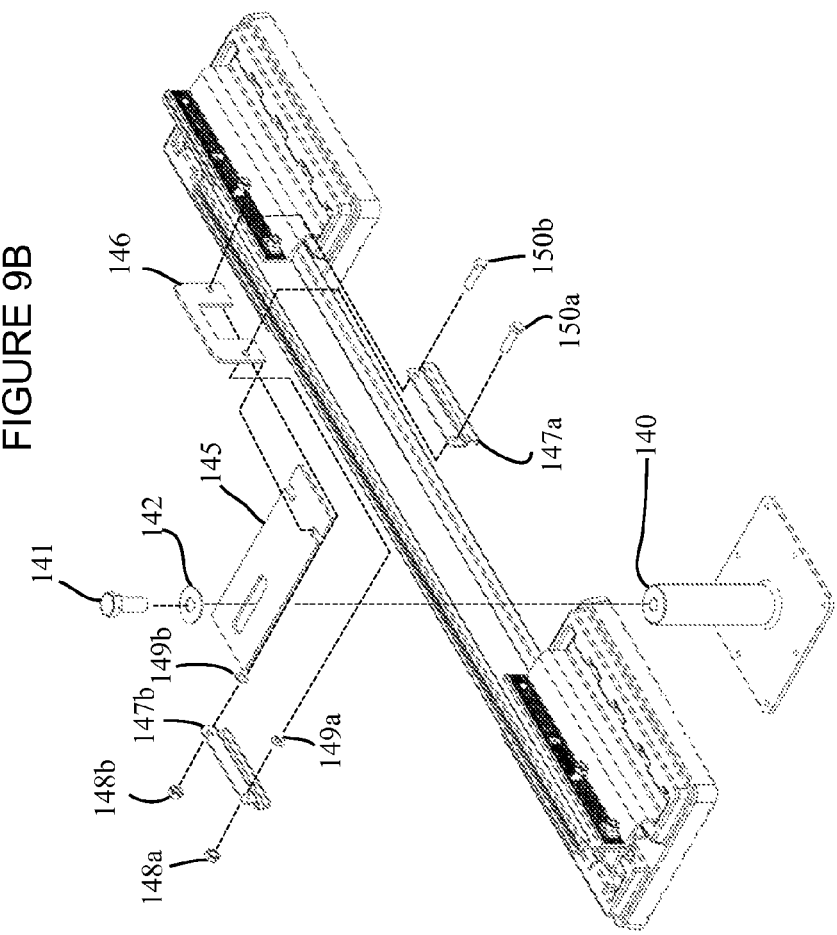
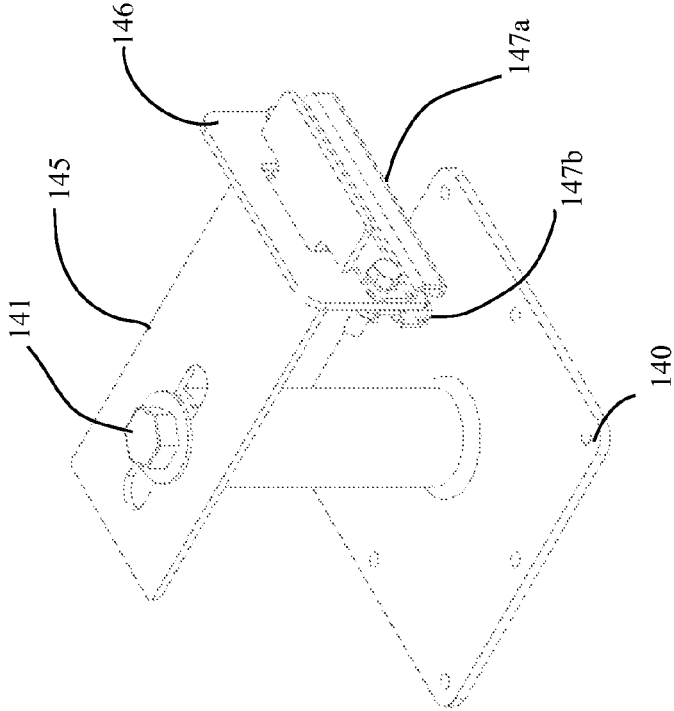

STRUCTURE FOLLOWING ROOF MOUNTED PHOTOVOLTAIC SYSTEM

This application claims the benefit of U.S. Provisional Application No. 61/627,381, filed Oct. 11, 2011, entitled STRUCTURE FOLLOWING ROOF MOUNTED PHOTOVOLTAIC SYSTEM, the disclosure of which is herein incorporated by reference.

BACKGROUND OF THE INVENTION

1. Field of the Invention

The present invention relates generally to photovoltaic mounting systems.

2. Description of the Related Art

After many years of experience installing Photovoltaic (PV) modules on commercial roof tops, it has become clear that there are economic advantages for a PV module mounting system to have a substructure that can adapt to different roof structural elements, such as beams and purlins, while being able to efficiently assemble as many PV modules onto a roof for maximum power production.

The roof mounting system should be viewed as having two distinct functions: 1) to adequately secure the optimal amount of PV modules (or groups of PV modules referred as panels) to effectively and economically orient the modules to produce power on the roof top; and 2) to adequately secure the PV modules or panels to the roof through a mechanism that is flexible enough to accommodate typical large flat roof structural elements.

Furthermore, there has been a greater understanding on environmental loads, particularly wind loads acting on large flat roof PV systems. By designing in the capability to move structural mounting components relative to the PV modules enables the PV system to remain secure, given the concentrations of forces that accumulate on certain regions of the PV array relative to the wind direction. During unseasonable wind events, such as a 300 year wind event, portions of the PV array will experience an uplifting acting force, and therefore it is necessary to have the PV racking components secured to each other. This notion of securing the entire rack to either a structural member or to other components of the array is often referred to as "load sharing" by those familiar with the art.

SUMMARY OF THE INVENTION

An adjustable photovoltaic panel mounting system that allows for variations in roofs and roof elements, while still maintaining a rigid and secure assembly is disclosed. The specific location for supporting feet and structural elements of the mounting system may be varied to allow for variations in roof features and different panel configurations. The mounting mechanisms are adjustable in both a North/South and a East/West direction to provide for maximum layout flexibility.

According to one embodiment, the present invention may comprise a photovoltaic panel mounting system including a panel assembly comprising, at least one photovoltaic panel, a first spar connected to a first edge of the panel, and a second spar connected to a second edge of the panel, wherein each spar comprises a slot along a length of the spar, a mounting sub-structure comprising a plurality of feet assemblies, and a plurality of longitudinal beams, each longitudinal beam connecting at least two feet together in a column, the feet assemblies and longitudinal beams forming at least two separate columns, wherein each longitudinal beam comprises a slot along a length of the longitudinal beam, a plurality of yokes comprising a bottom channel, the bottom channel configured to slide along a longitudinal beam in a first direction, but grasp and hold the longitudinal beam in a second direction, a plurality of pivot blocks connected to the first spar to connect the first edge of the panel assembly to corresponding yokes on the longitudinal beams, the pivot blocks formed to slide along the slot in a spar in order to align the pivot block to a corresponding yoke on a longitudinal beam, and a plurality of angle struts connected to the second spar to connect the second edge of the panel assembly to corresponding yokes on the longitudinal beams, each angle strut connecting to the second spar with a sliding attachment mechanism.

According to another embodiment, the present invention may comprise a photovoltaic panel mounting system comprising a plurality of panel assemblies, each panel assembly comprising a plurality of photovoltaic panels, a first spar connected to a first edge of each panel, and a second spar connected to a second edge of each panel, wherein each spar comprises a t-slot along a length of the spar, a mounting sub-structure comprising, a plurality of feet assemblies, and a plurality of longitudinal beams, each longitudinal beam connecting at least two feet together in a column, the feet assemblies and longitudinal beams forming at least two separate columns, wherein each longitudinal beam comprises a t-slot along a length of the longitudinal beam, a plurality of yokes comprising, a bottom channel, the bottom channel configured to slide along a longitudinal beam in a first direction, but grasp and hold the longitudinal beam in a second direction, and a t-bolt to secure the yoke to the longitudinal beam, a head of the t-bolt sliding in the t-slot of a longitudinal beam, a plurality of pivot blocks connected to the t-slot in the first spar with a t-bolt, in order to connect the first edge of the panel assembly to corresponding yokes on the longitudinal beams, the pivot blocks formed to slide along the slot in a spar in order to align the pivot block to a corresponding yoke on a longitudinal beam, and a plurality of angle struts connected to the t-slot in the second spar with a t-bolt, each angle strut connects the second edge of the panel assembly to corresponding yokes on the longitudinal beams.

The system may further include a lateral link connecting a first panel assembly to a second panel assembly, and/or at least one wind deflector on one edge of the panel assembly. In addition the system may further comprise at least one foot assembly connected to a first spar of one panel assembly and a second spar of a second panel assembly at a position intermediate to two columns of longitudinal beams.

Each foot assembly may comprise an elastomeric foot, and two foot brackets having mounting slots, wherein the two foot brackets attach two longitudinal beams together, and the mounting slots allow for variations in alignment of the longitudinal beams. The angle strut and pivot blocks may be connected to the yokes with pinned connections to allow for quick panel tilt up.

The angle strut may be connected to the spar with an angle strut bracket having a lip, and the pivot block may be shaped with an open slot to engage a pin in a yoke, allowing the panel assembly to rotate into position for assembly to the substructure.

The system may further include at least one ballast assembly attached to a longitudinal beam, and/or at least one roof connector assembly attached to a longitudinal beam to secure the mounting system to a roof.

According to a further embodiment, the present invention may comprise a photovoltaic panel mounting system comprising a plurality of longitudinal beams arranged in columns, each longitudinal beam having a top slot, a plurality of foot assemblies connected to the longitudinal beams, each foot assembly connected to two longitudinal beams in a column, wherein each foot assembly has mounting slots to align with mounting holes in each longitudinal beam such that the mounting slots provide for variances in a mounting surface, and a plurality of yokes attached to the top slots in the longitudinal beams.

The system may further include at least one panel assembly, the panel assembly comprising a plurality of photovoltaic panels, a first spar connected to a first edge of each panel, a plurality of pivot blocks attached to the first spar, and a second spar connected to a second edge of each panel, wherein each spar comprises a slot along a length of the spar. The system may further include a plurality of angle struts connected to the slot of the second spar, and to a respective yoke on a longitudinal beam.

BRIEF DESCRIPTION OF THE DRAWINGS

The present invention will be readily understood by the following detailed description in conjunction with the accompanying drawings, wherein like reference numerals designate like structural elements, and in which:

FIGS. 2A and 2B illustrate the mounting components shown in FIG. 2 in greater detail;

FIG. 4 is a plan view of PV module mounting sub structure foot assemblies;

FIG. 6 is a side elevation depicting an alternate embodiment of the system of FIG. 2;

FIG. 6B illustrates an upside down exploded isometric view of a panel detailing the connection using an alternative spar;

FIG. 6C depicts a side detail view of an alternate embodiment of FIG. 6B;

FIGS. 7A and 7B illustrate isometric and exploded isometric views of the connections between a lateral link and adjacent spars;

FIGS. 8A and 8B are isometric and exploded isometric views of a ballast assembly that secures the sub structure of the PV mounting system to the surface of a roof; and FIGS. 9A and 9B illustrate isometric and exploded views of a connector assembly that secures the sub structure of the PV mounting system to the surface of the roof.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

Figure 1:
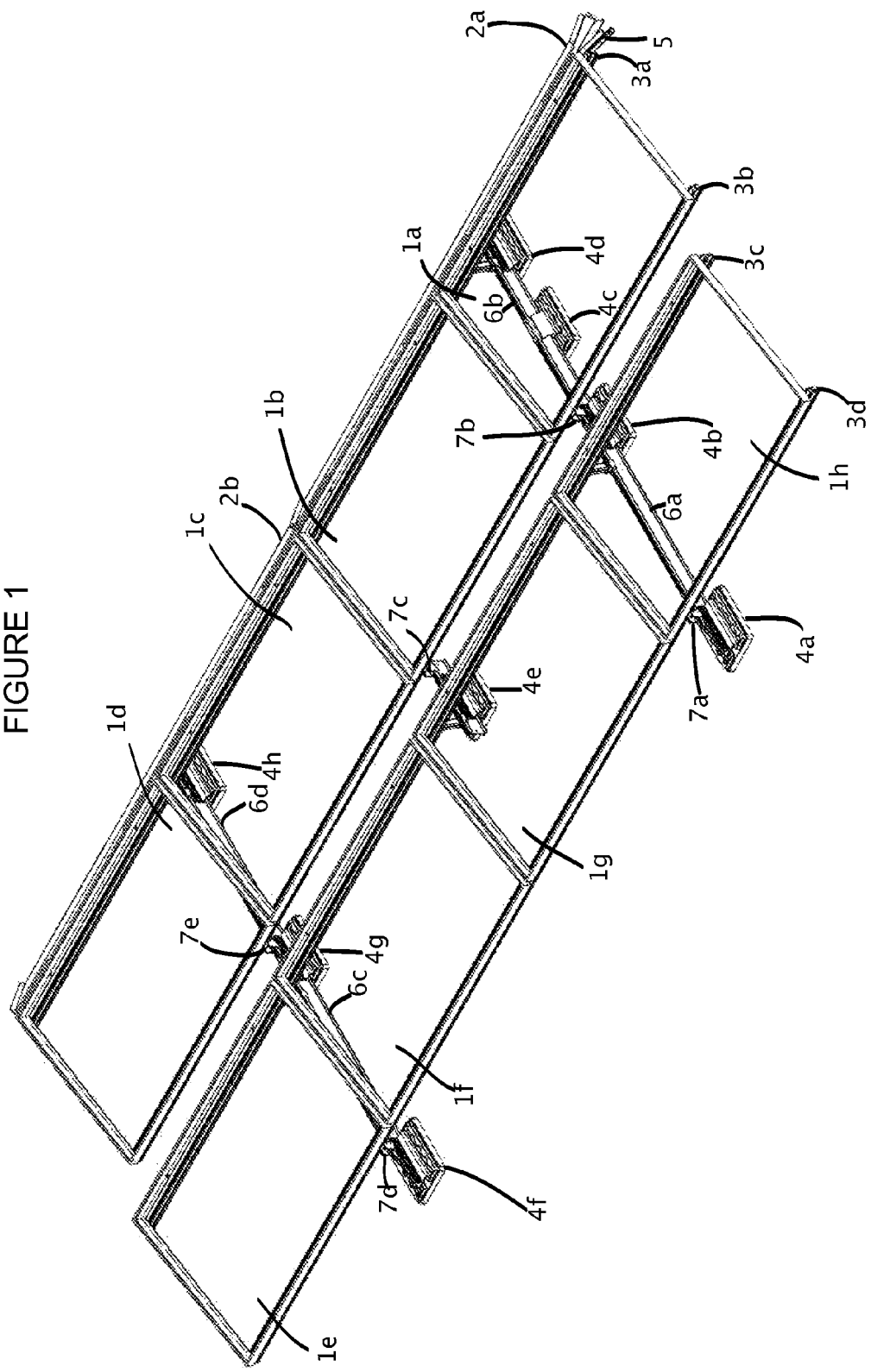
FIG. 1 is an isometric view of a PV mounting system, according to an embodiment of the present invention.

FIG. 1 is an isometric view of a PV mounting system, according to a preferred embodiment of the present invention. Illustrated in the figure are: PV modules 1a-1h, wind deflectors 2a and 2b, spars 3a-3d, elastomeric feet 4a-4h, a lateral link 5, longitudinal beams 6a-6d, and yokes 7a-7e.

FIG. 1 depicts a plurality of PV modules 1a-1h that are secured to horizontal beams that are referred to as spars 3a-3d. It is preferred that the PV modules 1a-1d are assembled in panels such that a number of PV modules are assembled to two spars 3a, 3b in order to form a panel. A panel may be assembled at the construction site of the roof or at another location where labor rates can be cheaper. Panels may then be stacked and shipped to the job site in order to save costs on the cost of labor at the desired job site, i.e. a commercial roof. Panels may then be assembled to the substructure. The substructure includes a foot assembly 4a-4h. Longitudinal beams, or long beams, 6a-6d secure to the feet assembly. The long beams 6a-6d then enable attachment of the panels such that the location of the of the beams relative to the panel may be adjusted in order that the feet reside on roofing structural elements, such as beams or purlins.

It is often desired the panels are able to tilt up in order to access the roof below, or to wire the PV modules. The panels are able to tilt up using a pivot block 10. In a preferred embodiment the pivot blocks engage a pin on the yokes, allowing the panel assembly to rotate up and down on the yokes.

In order to secure panels together in the horizontal or east/west direction it is desired to use a lateral link 5. The lateral link 5 allows for positive panel to panel mechanical connection with discrepancies in the flatness of the roof by accommodating a range plus or minus 2 degrees off the roof plane, the horizontal plane, or the vertical plane. Optionally, wind deflectors 2a-2b may be mounted to the northern most panels, or panels that do not have anything immediately adjacent north of them. The wind deflectors may help reduce upward forces created by the wind.

Note that as illustrated in FIG. 1, the feet elements 4a-4h can be varied in the positions, as dictated by the roof conditions. For example, four feet elements 4a-4d may by arranged along a line under two panels, whereas only three feet 4f-4h are used under the two panels at a different location. Similarly, an intermediate foot 4e can be added, as desired, at an intermediate location.

Figure 2:
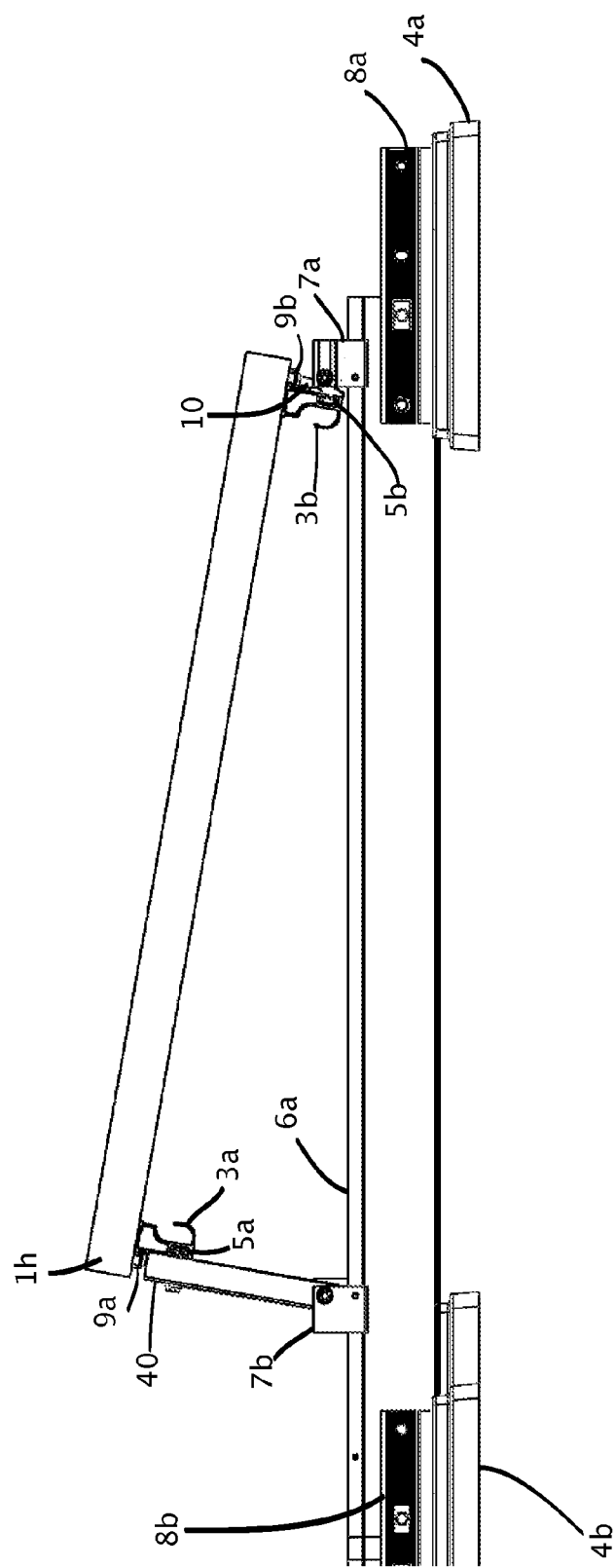
FIG. 2 is a side view elevation showing part of the PV mounting system, according to an embodiment of the present invention.

FIG. 2 is a side view elevation showing part of the PV mounting system of FIG. 1. The system includes PV module 1h, PV module clips 9a-9b, spars 3a-3b, angle strut 40, angle strut connection or t-studs 5a, 5b, t-stud nuts (not shown) yokes 7a-7b, a longitudinal beam 6a, elastomeric feet 4a-4b, roof following foot brackets 8a-8b, and pivot bracket, or pivot block, 10.

As illustrated in FIG. 2, a plurality of PV modules can be assembled to create panels either on the site of the installation or at another location. Depicted is the side view of a PV module 1h that is one of a plurality of modules used to form a panel. The panel consists of a discrete number of PV modules assembled to two spars, a north spar 3a, and a south spar 3b. The modules are held in place using clips 9a-9b. In this embodiment, the clips 9a-9b secure the PV module by attaching to mounting holes provided by the PV module manufacturer and by a lip feature in each spar that fixes the module to the spar in the longitudinal or north/south translation while enabling translation in the lateral or east/west direction. This enables PV modules to be assembled into panels using the same spars and clips for a multitude of different PV module manufacturers.

As the PV module hole locations change at the whim of the module manufacturer, the distance between the north spar and the south spar will simply increase or decrease to accommodate the variances with different PV modules. Because the panel may be installed offsite, it is desirable to be able to assemble the panel to the substructure easily and efficiently. The panel has a pivot block 10 that enables easy assembly and the ability for a controlled tilt up position that aids with wiring the PV modules. It is also desired to be able to vary tilt angles of the PV modules relative to the surface of the roof in order to maximize electrical production, depending on where the roof is located. The tilt would be fixed for a particular build by using the appropriate length angle strut 40. In this embodiment, the angle strut 40 is attached to the north spar with a T-slot and T-bolt 5a, 5b. It is preferred that both the angle strut 40 and the pivot block 10 are secured to their respective spars using the same features on both spars.

Additionally, before the T-bolts are tightened, the panels are securely fixed in all positions with the exception of the lateral or east/west direction. The T-slot connection allows for this translation in east/west direction, which is important because it will ultimately dictate the position of the sub structure, particularly the foot brackets 8a and 8b, foot 4a and 4b, relative to the structure of a roof. The panel is secured to the substructure via the angle struts and pivot blocks which connect to a yokes 7a and 7b respectively. It is preferred that this connection is pinned for assembly ease and panel tilt up. The yoke is then connected to the longitudinal beam 6a such that all translational and rotational freedoms are fixed when all connection members, such as fasteners or rivets are secured. It is preferred to be able translate the yoke longitudinally or north/south when the connection is loosened. In this embodiment the spar, longitudinal link, foot cover, pivot block, and yoke is mass produced by means of aluminum extrusion, but it would be possible to use a similar geometry using steel and roll forming, aluminum or steel sheet metal break forming, forming, coining, stamping, as well as using aluminum die casting or machining for the yoke and pivot block. In this embodiment, the foot is made from recycled tire rubber and is injection molded.

Figure 2A:
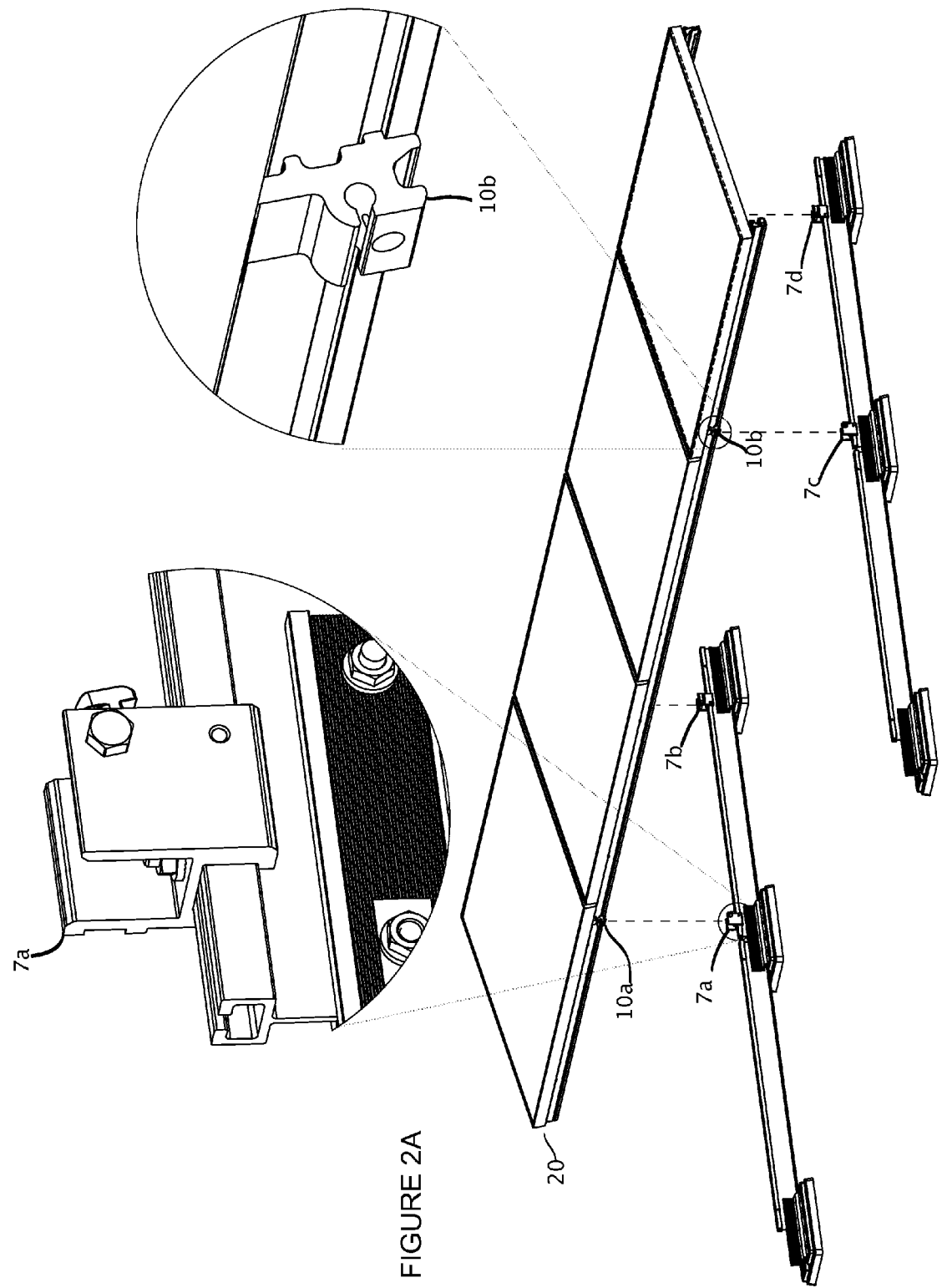

FIGS. 2A-2B illustrate the mounting components in greater detail. Specifically, the yokes 7a, 7b, 7c and 7d are formed to slide along the longitudinal beams to facilitate positioning of the panels around roof elements. An internal clamp fixes the yoke to the longitudinal beam at a desired position. The pivot block 10b connects the panel assembly to the yokes.

Figure 3:
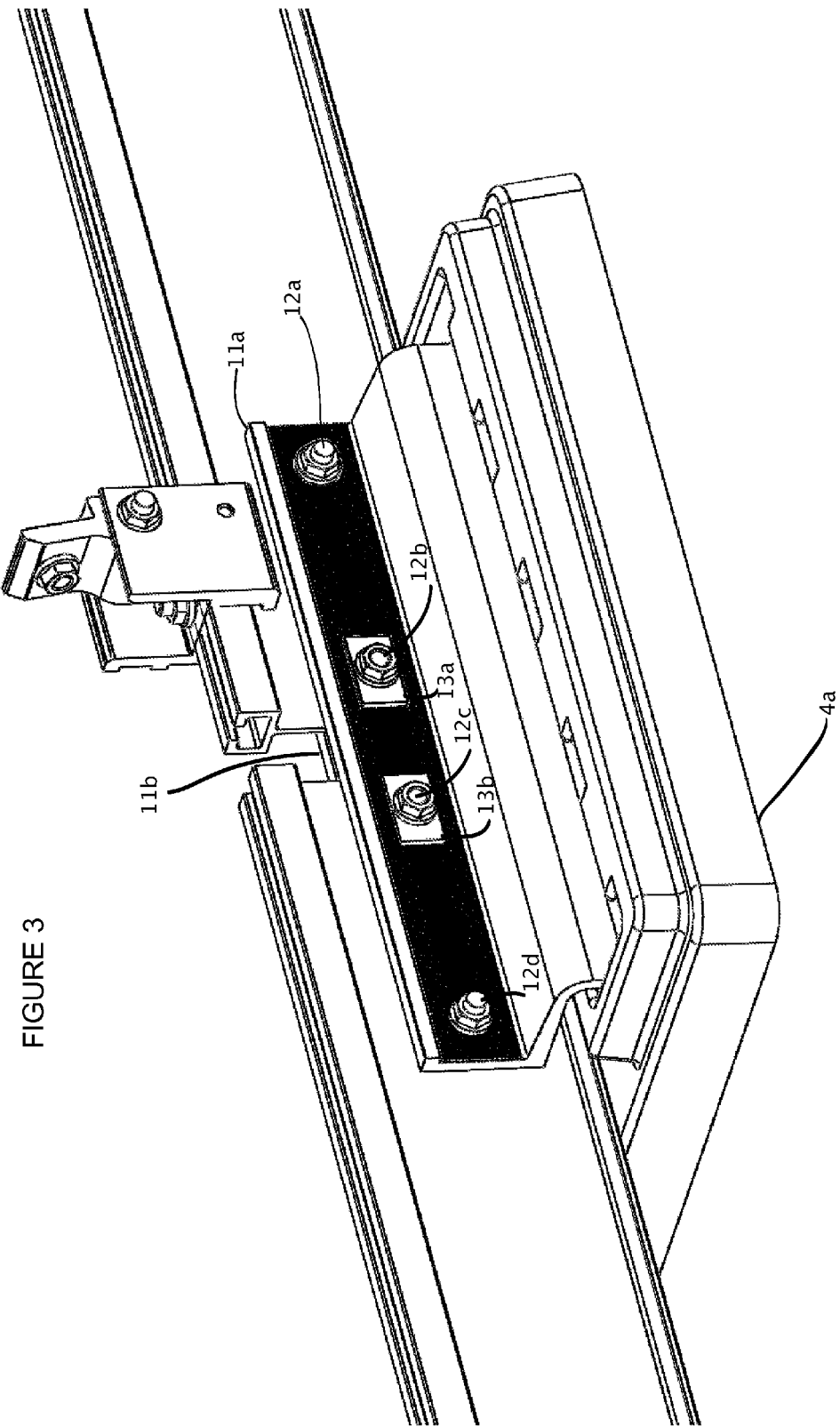
FIG. 3 is a detailed isometric view showing the PV mounting system sub structure foot assembly, according to an embodiment of the present invention.

FIG. 3 shows a detailed assembly of the foot assembly. The foot assembly is designed to hold two adjacent longitudinal beams of discrete lengths in fixity when secured. The foot assembly comprises two foot brackets 11a and 11b which contain features that allow for discrepancies in roof flatness. The foot brackets also act to transmit the structural properties of the longitudinal beam through the connections therein. The outer connection points are preferred to be holes or pin locations with a fasteners 12a-12d, such that each longitudinal beam may rotate around the pinned location 12a and 12d. This is desired so that the foot may remain in contact with the roof even between and over roof valleys and crickets. The foot brackets inner connections are preferred to be vertical slots (not pictured) and a pin connection. Washers 13a-13b with a complementary pattern of teeth that are matched to a pattern of teeth located on the foot bracket 11a and 11b. This provides structural fixity once all connections are tightened, which is desirable for structural force transmission.

Figure 3A:
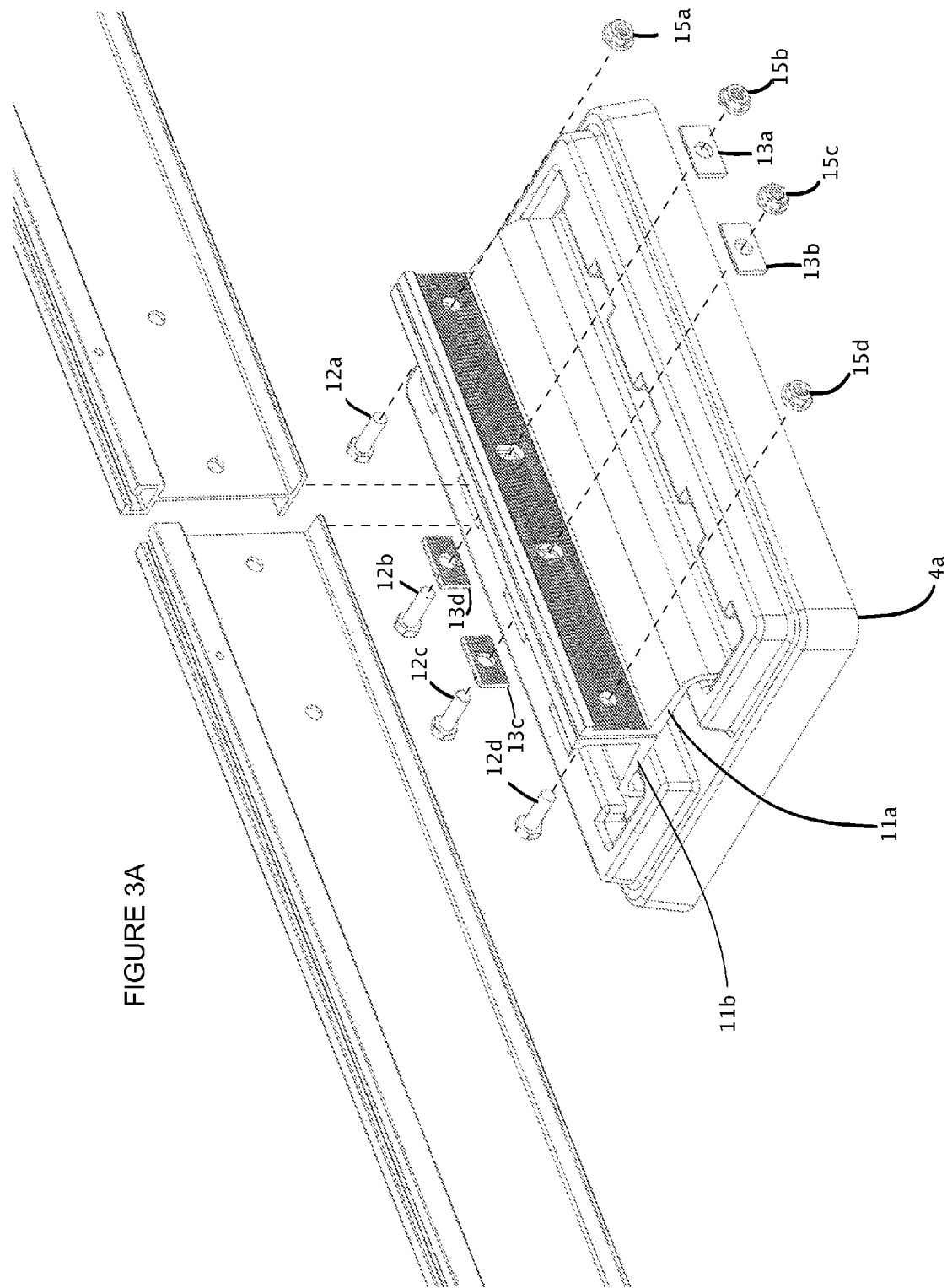
FIG. 3A shows an exploded view of the mounting substructure foot assembly of FIG. 3.

FIG. 3A shows an exploded view of the mounting substructure foot assembly. Specifically, the foot assembly includes two inner slots formed on components 11a, 11b which allows the longitudinal links to pivot in order to conform the structure to variations in the roof. The surface of the mounting bracket components 11a, 11b are formed with ridges/bumps. These ridges interface with washers 13a-13d which have complementary ridges on their inner surfaces. When the bolts 12b, 12c are tightened in place, the washers 13a-13d interlock with the ridges on the surface of the bracket components 11a, 11b to effectively lock the longitudinal beams into place.

Figure 3B:
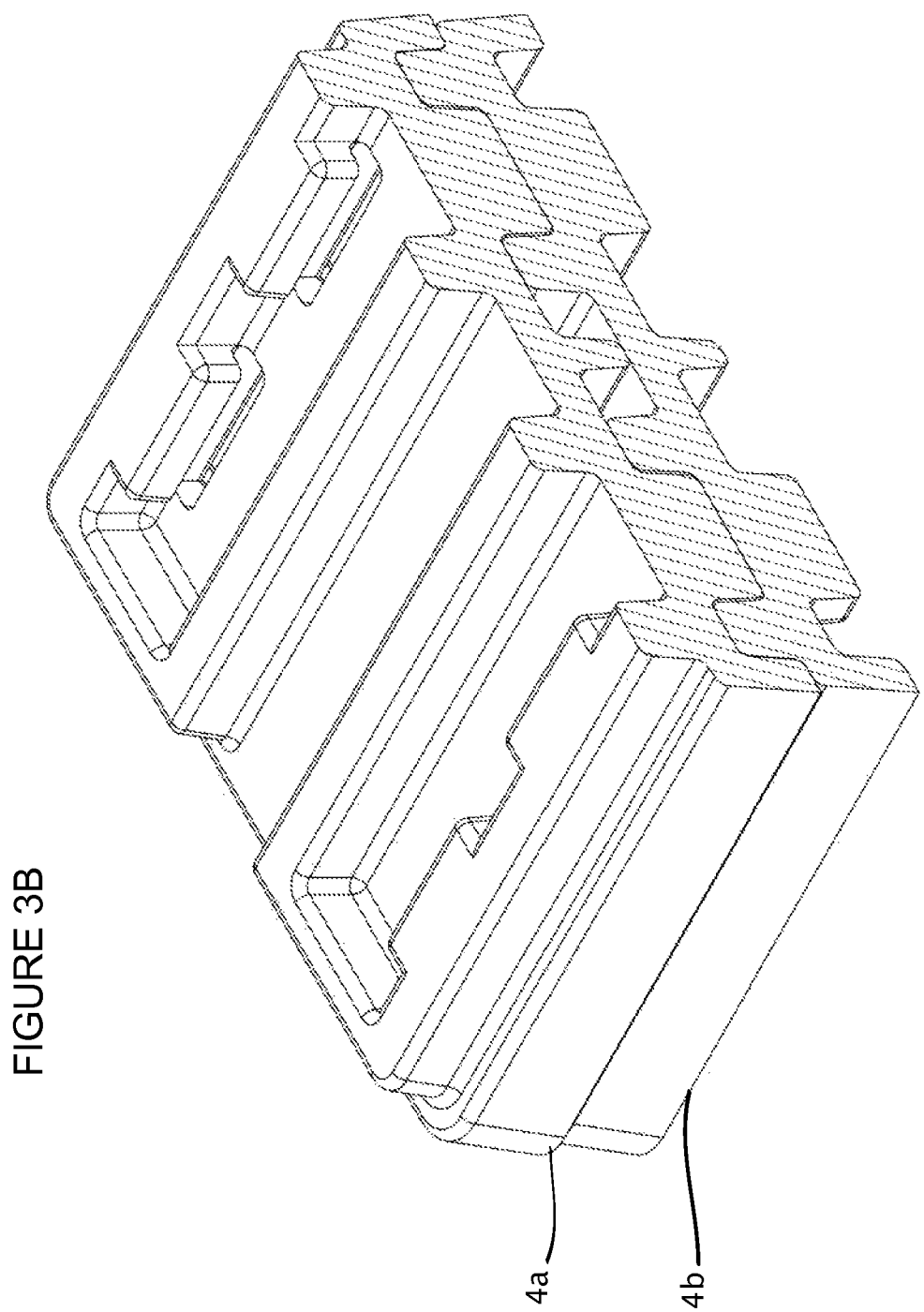
FIG. 3B depicts two feet in an isometric elevation and sectioned through the center.

FIG. 3B illustrates the capability for one foot 4a to stack on top of another 4b. This is desirable for the ability to shim the members of the feet in order to accommodate discrepancies of roof flatness, or crickets and valleys commonly found on commercial rooftops.

FIG. 4 shows an example of lateral, or east/west, movement of the substructure, particularly the longitudinal beams and the foot assemblies 15a and 15b, translated to a new position 17a and 17b, relative to the two panels comprised of PV modules 16a-16h. This is desired so that the feet may locate directly on roof structural elements (not pictured). When the length of the longitudinal beam are increased or decreased (change in longitudinal beam length not pictured), the foot assembly locations change and can then be matched to ensure that the feet fall on the roof structure.

Figure 5:
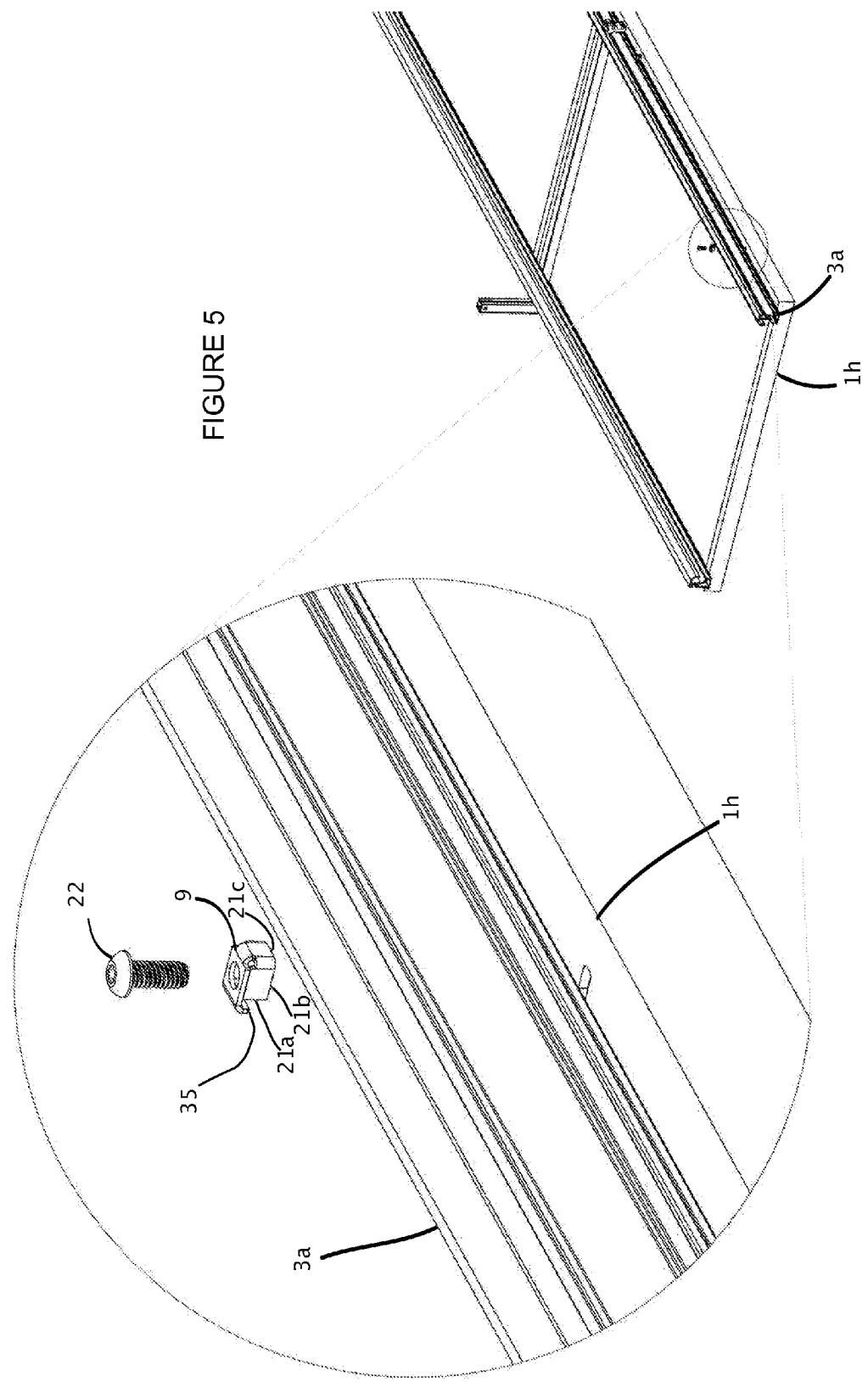
FIG. 5 is an isometric view with detail of an exploded assembly of PV according to an embodiment of the present invention, illustrating the panel upside down relative to its installed position on a roof.

FIG. 5 shows an example of the preferred attachment method for attaching a PV module 1h to a spar 3a. This view shows the panel upside down relative to its installed position on the roof. A PV module clip 9 secures the PV module 1h to the spar 3a. It is preferred that the number of clips used to secure the PV modules matches the pre-existing holes inside the PV modules that are provided for use for installation by the PV module manufacture, typically this is 4 clips per module. It is desired that the clip acts to secure the PV module by engaging a feature located on the spar, return 31 in FIG. 6C with a return 35 on the clip. In this embodiment, the clip 20 is fashioned from stainless steel sheet using a progressive die stamping and forming process. The clip has grounding features 21a-21c that act as a grounding mechanism, such that extra grounding steps are not required during installing the PV system. The grounding features are sharp features that are designed to break the surface of the PV module frame, that often has thin layer of anodization, while being tightened. This is desired in order to form a secure grounding path to the spar.

Figure 6A:
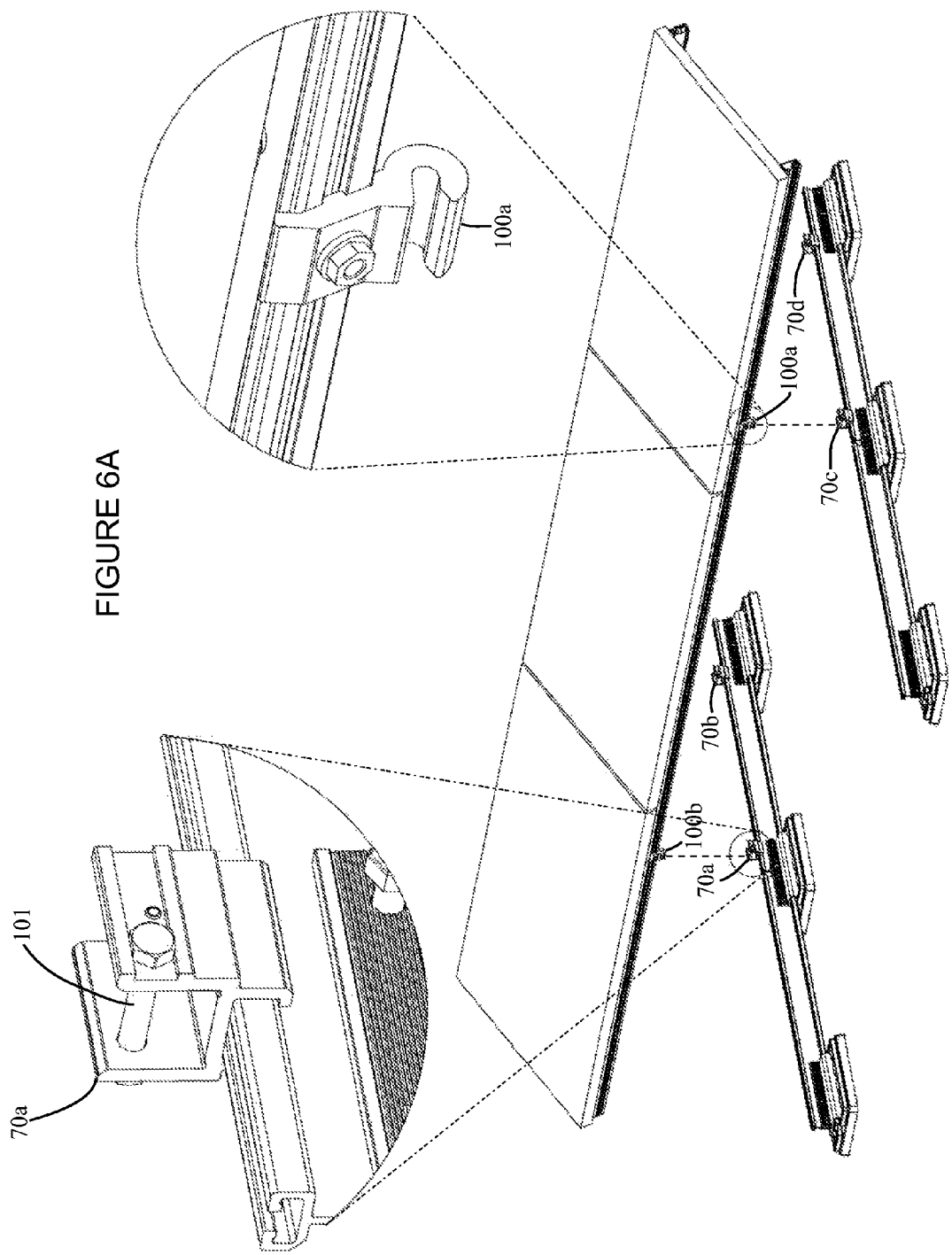
FIG. 6A is an exploded isometric illustration further detailing the alternative pivot block connection shown in FIG. 6.

FIGS. 6, 6A, 6B, and 6C illustrate an alternative embodiment to the system of FIG. 2. FIG. 6 depicts an alternative technique for connecting the northern spar 30a to the angle strut 40. This alternative connection may be more desirable because it creates a more secure connection while making it easier on the assembler. The angle strut bracket 110 secures angle strut 40 to spar 30a by using a lip 111 (FIG. 6B) that rests inside the opening of the angle strut (not pictured). This is desirable as installers can simply rest the northern ends of the panels down into the angle struts. The angle strut bracket can then be secured using fastener 115 in which engages both angle strut and angle strut bracket through the hole 112 shown in FIG. 6B. The angle strut is secured to the spar such that it allows for east west translation along the spar until the nut 50 is tightened to t-stud 51. FIG. 6A illustrates alternative pivot blocks 100a and 100b. The pivot block 100a, 100b engages with the yoke by way of the yoke pin 101. The pivot block is shaped with an open slot that accepts the yoke pin when the panel is being assembled to the sub structure and is designed to be installed in with the PV module's top surface to be normal with the installation surface. The panel is allowed to rotate into a lowered state that will ultimately be a secured state. FIG. 6A shows the translation of the panel down onto the substructure such that pivot block 100b engages with yoke assembly 70a and pivot block 100a engages with yoke assembly 70c respectively. Both the alternative pivot block and angle strut bracket are designed to engage with the alternative spar 30a shown in FIG. 6C. A return 32 engages with the top of either the pivot block, or the angle strut bracket depending if it is a northern spar or southern spar. The t-slot 33 secures either the pivot block or angle stud bracket using a t-stud and nut, or some alternative fastener such as a carriage bolt.

FIGS. 7A and 7B show detail of the lateral connection discussed in FIG. 1. The lateral link 5, secures adjacent panels in the east/west direction. In this embodiment, the lateral link 5 is shown as an aluminum extrusion and has teeth the same shape and pitch as foot bracket 11a and 11b shown in FIG. 3A. This is for the same reason as discussed above, which is to allow for a variety of roof undulations in the east/west direction. T-studs 5a and 5b are connected to an eastern panel and t-studs 5c and 5d are connected to a western panel. The lateral link 5 is then assembled to the two spars such that t-stud 5a inserts into hole 51a to form a pivot and is secured with nut 15a. T-stud 5b fits through slot 52a and washer 13a which has complimentary ribs that match the lateral link that allow for a relative rotation until the nuts are fully tightened, at which time the connection becomes ridged and secure. The eastern panel is assembled to the lateral link in the same manner as assembling the western panel.

FIGS. 8A and 8B show a mechanism to secure the sub structure to the surface of the roof without using any mechanical connections to the roof's structure. This ballast assembly comprises a receptacle 200 to place ballast. It is preferred to use a readily available material and form for ballast such as roofing pavers made from concrete. In this embodiment, the receptacle is a wire form basket 200 that accepts a plurality of ballast elements. It is also desirable to keep the ballast and all other metal materials off the surface of the installation and ballast pads 201a and 201b are designed to fit inside the ballast basket 200 such that material extends beyond the holes of the basket and touch the next surface. This allows for the wires of the ballast basket to hang above the roof surface but yet still allow the ballast to prevent system movement as a result of environmental loading. In this embodiment, the ballast pads are made from a recycled elastomer the same as the feet. The ballast basket 200 is designed to straddle the long beam and may be translated north and south along the long beam until it is properly secured. The mechanical connection of the basket to the long beam is made with brackets 202a and 202b which engage with the wire's forming the ballast basket. T-studs 5a and 5b engage through a hole in ballast brackets 202a and 202b respectively, and then are secured with nuts 40a and 40b once the basket is in a desirable position.

FIGS. 9A and 9B are a showing the connector assembly which is often desired when the PV system must be mechanically secured to the roof. This connector assembly consists of a post assembly 140 that may be easily flashed to a roof to prevent liquid ingress. The post assembly 140 may be secured to the roof using standard hardware, as is known to those skilled in the art. The mechanical connection between the PV system and the roof is critical as it must allow for certain building and installation tolerance, while being able to resist forces that are experienced in a significant environmental event, such as a wind storm. The failure of the connection must be understood and act in concert with the other materials and connections within the entire PV system. This embodiment allows many degrees of freedom until the assembly is fully secured. The connector arm 145 rests on top of the post and is secured through a slot with bolt 141. The slot in the arm allows for relative rotation and translation to the post as those familiar with the art know the posts are often secured in place before the assembly of the PV system. U-bracket 146 engages notches cutout in the arm. The bottom of the u-bracket also aligns inside of the t-slot located on top the long beam. Connector clamps 147a and 147b align with holes in the u-bracket and bolts 150a and 150b then thread through connector clamp 147a, u-bracket 146, and connector clamp 147b and are ultimately tightened with nuts 148a and 148b respectively. This connection allows for the necessary amount of rotation and translation until the nuts are fully tightened.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A photovoltaic panel mounting system comprising:
   a panel assembly comprising:
   at least one photovoltaic panel;
   a first spar connected to a first edge of the panel; and
   a second spar oriented parallel to the first spar and connected to a second edge of the panel; and
   wherein each spar comprises a slot along a length of the spar;
   a mounting sub-structure comprising:
   a plurality of feet assemblies; and
   a plurality of longitudinal beams, each longitudinal beam oriented perpendicular to the first and second spars, each longitudinal beam connecting at least two feet together in a column, the feet assemblies and longitudinal beams forming at least two separate columns;
   wherein each longitudinal beam comprises a slot along a length of the longitudinal beam;
   a plurality of yokes comprising:
   a bottom channel, the bottom channel configured to slide along a longitudinal beam in a first direction, but grasp and hold the longitudinal beam in a second direction;
   a plurality of pivot blocks connected to the first spar to connect the first edge of the panel assembly to corresponding yokes on the longitudinal beams, the pivot blocks formed to slide along the slot in a spar in order to align the pivot blocks to a corresponding yoke on a longitudinal beam; and
   a plurality of angle struts connected to the second spar to connect the second edge of the panel assembly to corresponding yokes on the longitudinal beams, each angle strut connecting to the second spar with a sliding attachment mechanism.

2. The photovoltaic panel mounting system of claim 1, further comprising:
   a lateral link connecting a first panel assembly to a second panel assembly.

3. The photovoltaic panel mounting system of claim 1, further comprising:
   at least one wind deflector on one edge of the panel assembly.

4. The photovoltaic panel mounting system of claim 1, further comprising:
   at least two panel assemblies mounted to the sub-structure.

5. The photovoltaic panel mounting system of claim 4, further comprising:
at least one foot assembly connected to a first spar of one panel assembly and a second spar of a second panel assembly at a position intermediate to two columns of longitudinal beams.

6. The photovoltaic panel mounting system of claim 1, further comprising a plurality of "t-bolt" fasteners, wherein the slot in each spar is a "t-shaped" slot configured to receive the "t-bolt" fasteners, wherein each "t-bolt" fastener slides along the slot to allow for adjustable positioning of the panel assemblies and sub-structure.

7. The photovoltaic panel mounting system of claim 6, wherein the slot in each longitudinal beam is a "t-shaped" slot configured to receive a "t-bolt" fastener, to secure a yoke to a longitudinal beam.

8. The photovoltaic panel mounting system of claim 1, wherein each foot assembly comprises:
an elastomeric foot; and
two foot brackets having mounting slots;
wherein the two foot brackets attach two longitudinal beams together, and the mounting slots allow for variations in alignment of the longitudinal beams.

9. The photovoltaic panel mounting system of claim 1, wherein the angle strut and pivot blocks are connected to the yokes with pinned connections to allow for quick panel tilt up.

10. The photovoltaic panel mounting system of claim 1, wherein the angle strut is connected to the spar with an angle strut bracket having a lip.

11. The photovoltaic panel mounting system of claim 1, wherein the pivot block is shaped with an open slot to engage a pin in a yoke, allowing the panel assembly to rotate into position for assembly to the sub-structure.

12. The photovoltaic panel mounting system of claim 1, further comprising at least one ballast assembly attached to a longitudinal beam.

13. The photovoltaic panel mounting system of claim 1, further comprising at least one roof connector assembly attached to a longitudinal beam to secure the mounting system to a roof.

14. A photovoltaic panel mounting system comprising:
a plurality of panel assemblies, each panel assembly comprising:
a plurality of photovoltaic panels;
a first spar connected to a first edge of each panel; and
a second spar connected to a second edge of each panel;
wherein each spar comprises a t-slot along a length of the spar;
a mounting sub-structure comprising:
a plurality of feet assemblies; and
a plurality of longitudinal beams, each longitudinal beam connecting at least two feet together in a column, the feet assemblies and longitudinal beams forming at least two separate columns;
wherein each longitudinal beam comprises a t-slot along a length of the longitudinal beam;
a plurality of yokes comprising:
a bottom channel, the bottom channel configured to slide along a longitudinal beam in a first direction, but grasp and hold the longitudinal beam in a second direction; and
a t-bolt to secure the yoke to the longitudinal beam, a head of the t-bolt sliding in the t-slot of a longitudinal beam;
a plurality of pivot blocks connected to the t-slot in the first spar with a t-bolt, in order to connect the first edge of the panel assembly to corresponding yokes on the longitudinal beams, the pivot blocks formed to slide along the slot in a spar in order to align the pivot blocks to a corresponding yoke on a longitudinal beam; and
a plurality of angle struts connected to the t-slot in the second spar with a t-bolt, each angle strut connects the second edge of the panel assembly to corresponding yokes on the longitudinal beams.

15. The photovoltaic panel mounting system of claim 14, further comprising:
a lateral link connecting a first panel assembly to a second panel assembly.

16. The photovoltaic panel mounting system of claim 14, further comprising:
at least one wind deflector on one edge of the panel assembly.

17. The photovoltaic panel mounting system of claim 14, further comprising:
at least one foot assembly connected to a first spar of one panel assembly and a second spar of a second panel assembly at a position intermediate to two columns of longitudinal beams.

18. The photovoltaic panel mounting system of claim 14, wherein each foot assembly comprises:
an elastomeric foot; and
two foot brackets having mounting slots;
wherein the two foot brackets attach two longitudinal beams together, and the mounting slots allow for variations in alignment of the longitudinal beams.

19. The photovoltaic panel mounting system of claim 14, wherein the angle strut and pivot blocks are connected to the yokes with pinned connections to allow for quick panel tilt up.

20. The photovoltaic panel mounting system of claim 14, wherein the angle strut is connected to the spar with an angle strut bracket having a lip.

21. The photovoltaic panel mounting system of claim 14, wherein the pivot block is shaped with an open slot to engage a pin in a yoke, allowing the panel assembly to rotate into position for assembly to the sub-structure.

22. The photovoltaic panel mounting system of claim 14, further comprising at least one ballast assembly attached to a longitudinal beam.

23. The photovoltaic panel mounting system of claim 14, further comprising at least one roof connector assembly attached to a longitudinal beam to secure the mounting system to a roof.

* * * * *